3,692,553
CARBON BLACK CONTAINING ORGANOMETAL COMPOUNDS OF THE ALLYLIC OR BENZYLIC TYPE
Richard L. Smith and Carl A. Uraneck, Bartlesville, Okla., assignors to Phillips Petroleum Company
No Drawing. Filed May 7, 1971, Ser. No. 141,430
Int. Cl. C08h 17/08; C09c 1/48, 1/56
U.S. Cl. 106—307                          8 Claims

ABSTRACT OF THE DISCLOSURE

Organomental compounds of the allylic or benzylic type are combined with carbon blacks containing at least 0.2 percent oxygen. As a result, the hydrophilic properties of the carbon blacks are increased, and the cure rates of vulcanizable rubber compositions are retarded when the blacks are compounded with these.

---

This invention relates to carbon blacks of at least 0.2 weight percent oxygen content combined with organometal compounds where the metal is germanium, tin, lead or antimony and the organic portion of the molecule contains allylic or benzylic type radicals.

Many years ago, it was proposed to add chlorides of various metals, including tin, to carbonaceous materials such as coke to aid in the removal of gaseous, volatile, liquid, tarry, and pitchy hydrocarbons or impurities (U.S. Pat. 2,201,050). More recently, acidic blacks, such as channel blacks, have been treated with salts of heavy metals and weak organic acids. The treated black is washed with a solvent to remove the free acid formed in the reaction, and this is said to increase the suitability of the blacks for paint pigments (U.S. Pat. 2,920,976).

Still more recently, it has been proposed to add heat-decomposible organic compounds of iron, cobalt and nickel to carbon black in order to make a magnetic carbon black while avoiding damage to the refractory portions of the carbon black reactor (U.S. Pat. 3,431,205).

Insofar as we are aware, no one has previously proposed the combination of carbon black with certain allylic or benzylic type organomental compounds of germanium, tin, lead or antimony. Surprisingly, such combination provides a significant retardation of the cure in conventional vulcanizable rubber compositions. This eliminates the addition of a separate compounding ingredient for the purpose of cure retardation. Also, the treated carbon blacks of the invention have a significant increase in hydrophilic properties in that they are much more readily wetted by water than untreated carbon black. The carbon blacks of the invention, therefore, can be advantageously employed in rubber-carbon black masterbatching processes utilizing an aqueous dispersion of carbon black. In such cases, the amount of carbon black dispersing agent added to the masterbatch recipe can be substantially reduced, or in many cases, altogether elminated.

The advantages of the invention appear to be peculiar to the organomental compounds of tin, lead, germanium and antimony which contain allylic type radicals, as particularly exemplified by tetraallyltin or benzylic radicals, as particularly exemplified by butyltribenzyltin. Carbon black removes and combines with these compounds when introduced into a liquid phase containing them. In contrast, where carbon black is introduced into a liquid phase containing tetraphenyltin, practically none of it is removed by the carbon black. Further, it appears from our data that there is an actual combination of the organomental compound with the carbon black, and not a mere physical adsorption. Thus, the organomental compounds of the invention are not removed from the carbon black by treatment such as extraction for extended periods of time with refluxing solvents.

The presence of small quantities of water, for example, 0.5 to 10 percent by weight based on the carbon black appears to be important to the combination of the carbon black with the organomental compounds of the invention. Most carbon blacks, as produced, contain such quantities of water but, when thoroughly dried to remove their natural water content, the amount of organomental compound combined with the black is sharply reduced or wholly eliminated.

Our invention is applicable to a wide variety of commercially available carbon blacks, including all types of oil furnace blacks. Blacks which have been oxidized, for example, with ozone, nitric acid, oxygen, are within the scope of the invention. Channel blacks and gas furnace blacks of all types can be employed. The invention is not applicable to acetylene blacks, gas thermal blacks, or other blacks which have undergone degassing under heat such as a graphitization process. The latter blacks contain less than 0.2 weight percent oxygen, and are thus not within the scope of the invention.

The organomental compounds of the invention can be represented by the following general formula:

$$R_xR'_yM$$

wherein

R is hydrogen or an aliphatic, cycloaliphatic, or aromatic radical containing from 1 to 20 carbon atoms,
R' is an allylic type ($-CR''_2-CR''=CR''_2$) or benzylic type ($-CR''_2-R'''$) radical,
R'' is hydrogen or a hydrocarbyl radical containing from 1 to 6 carbon atoms,
R''' is an aromatic radical containing from 6 to 10 carbon atoms,
M is germanium, tin, lead, or antimony, and
y is an integer of from 1 up to valence of M and
x is an integer equal to the valence of M—y.

More specifically, from the standpoint of availability, R can advantageously be hydrogen or an alkyl group having 1 to 10 carbon atoms, R' can be a radical having the formula $-CH_2-CH_2=CH_2$ or $CH_2-R'''$, R''' can be an aromatic radical containing from 6 to 10 carbon atoms, M is tin, x and y are integers whose sum is 4, and y has a value of at least 1.

The amount of the organomental compound can be varied over a wide range. Nominally, the amount of organomental compound employed is sufficient to provide from 0.01 to 15, preferably 0.1 to 7, weight percent metal (M) on the treated black.

Examples of such organomentals include ethyltribenzylgermanium, diphenypldiallylgermanium, tetraallylgermanium, allyltriphenylgermanium, tetraallyltin, tetrabenzyltin, diphenyldiallyltin, phenyltribenzyltin, di-n-butyldiallyltin, eicosyltriallyltin, triphenylbenzyltin, tetraallyllead, tetrabenzyllead, allytriphenyllead, triphenylbenzyllead, dimethyltriallylantimony, and diphenyltribenzylantimony. Mixtures can also be used.

The carbon black which are treated according to this invention can be in pelleted or flocculent form. The treatment can take place in the absence of a diluent with the organometal compound in either the liquid or vapor phase. More advantageously, we contact the carbon black with the organometal compound in the presence of a hydrocarbon diluent. For example, a hydrocarbon slurry of the black can be stirred with a hydrocarbon solution of the organometal. This permits samples of the black to be withdrawn from time to time and analyzed for metal content.

Small amounts of water greatly accelerate the reaction of the organometals with the carbon black according to this invention. However, commercial carbon blacks generally contain sufficient water to provide the desired accelerating effect so that no water need be added to the reaction system.

The temperature of contacting the carbon blacks with the organometals of this invention is not part of the invention. An illustrative range is 0 to 150° C., more specifically 25 to 80° C. The time of contact depends on the reactivity of the particular carbon black and organometal combination, the temperature and the amount of metal desired on the final treated carbon black. It may vary from a few minutes to several days.

Following are specific examples of our invention:

EXAMPLE I

A slurry of 10 grams of a high abrasion furnace (HAF) type black (Industry Reference Black #2—IRB #2) in 200 milliliters of cyclohexane was agitated at 70° C. with 0.4 mmole of tetraallyltin. Aliquots of the liquid phase were withdrawn at various reaction times and analyzed for tin content by an X-ray fluorescence procedure. The relative amounts of tin in the liquid phase at the indicated reaction times are shown below.

| Reaction time, minutes: | Tin content, percent original in liquid phase |
|---|---|
| 0 | 100 |
| 15 | 79 |
| 30 | 62 |
| 60 | 37 |
| 180 | 0 |

The above results indicate that the carbon black readily removed the tetraallyltin from the liquid phase.

EXAMPLE II

Other runs were conducted in the same manner as Example I except that variable amounts of tetraallyltin were employed and control runs containing no carbon black (IRB #2) were also carried out. The results of these runs are tabulated below.

TABLE I

| Run number | 1 | 2 | 3 | 4 | 5 | 6 |
|---|---|---|---|---|---|---|
| Cyclohexane, milliliters | 200 | 200 | 200 | 200 | 200 | 200 |
| Industry Reference Black #2, grams | 10 | 0 | 10 | 0 | 10 | 0 |
| Tetraallyltin, mmoles | 0.8 | 0.8 | 2.0 | 2.0 | 4.0 | 4.0 |
| Percent of original tin remaining at reaction time of— | | | | | | |
| 0 hours | 100 | 100 | 100 | 100 | 100 | 100 |
| 0.5 hours | 87 | | | | | |
| 0.75 hours | | | 90 | | | |
| 1.0 hours | 77 | | | | | |
| 1.6 hours | | | | 86 | | |
| 2.0 hours | | | 81 | | | |
| 3.0 hours | 40 | | | | | |
| 3.75 hours | | | 65 | | | |
| 4.0 hours | | | | 74 | | |
| 5.0 hours | 9 | | | | | |
| 6.0 hours | | | 38 | | | |
| 7.5 hours | | | | 45 | | |
| 8.0 hours | 2 | 100 | | | | |
| 9.0 hours | | | 23 | 100 | | |
| 12.2 hours | | | | | 12 | |
| 18.3 hours | | | | | 0 | 99 |

The results from these runs again demonstrate the ease with which the carbon black removes the tetraallyltin from the hydrocarbon liquid phase.

EXAMPLE III

Other runs were made in which the reactivity of butyltribenzyltin and tetraphenyltin with carbon black (IRB #2) was compared. These runs were conducted in the same manner as those in Examples I and II. The conditions and results are given in Table II.

TABLE II

| Run number | 1 | 2 | 3 | 4 |
|---|---|---|---|---|
| Cyclohexane, milliliters | 200 | 200 | 200 | 200 |
| Industry Reference Black #2, grams | 0 | 10 | 0 | 10 |
| Butyltribenzyltin, millimole | 0.4 | 0.4 | | |
| Tetraphenyltin, millimole | | | 0.4 | 0.4 |
| Percent of original tin remaining at reaction time of— | | | | |
| 0 hours | 100 | 100 | 100 | 100 |
| 1.0 hours | | 84 | | |
| 5.5 hours | 97 | 52 | 100 | 100 |

The above results demonstrate that while the butyltribenzyltin is removed from the liquid phase by the carbon black, tetraphenyltin is not. Thus, the nature of the organometal compound is important in forming the treated carbon blacks of this invention and the removal of the organotin compound from the liquid phase is not a mere physical adsorption by the carbon black.

EXAMPLE IV

Another run was made in which a carbon black treated with tetraallyltin according to this invention was extracted with refluxing cyclohexane in a Soxhlet type extraction apparatus. The amounts employed for the preparation of the blacks were:

| Run number | 1 | 2 |
|---|---|---|
| Cyclohexane, milliliter | 500 | 500 |
| Carbon black,[a] grams | 50 | 50 |
| Tetraallyltin, millimole | 40 | |

[a] Commercial oil furnace black, type N110 under ASTM D 2516-66T.

Each reaction mixture was agitated at 70° C. for about 18 hours. At the end of this period, each of the reaction mixtures was poured into a shallow pan and the liquid evaporated in a fume hood. The blacks were then dried in a vacuum oven at 50° C. The weight of carbon black recovered in Run No. 1 was 56.2 grams and in Run No. 2 it was 48.8 grams.

Analysis by X-ray fluorescence showed the treated black of Run No. 1 to contain 6.9 weight percent tin which was 83 percent of the tin available in that run. The carbon black was then extracted for 4 hours with refluxing cyclohexane and the carbon black analyzed again for tin content. This latter analysis showed 7.0 weight percent tin. This demonstrates that the carbon blacks treated by the organometal compounds of this invention have become attached to the metal component of said organometal compounds very tightly. It is further indicated by this result that the removal of the organometal compound from the liquid phase by the carbon black is not merely a physical adsorption process. Run 2, the control run, was employed to provide a check on the effectiveness of black recovery and other handling operations in the run of the invention, Run 1.

EXAMPLE V

Other runs were made to determine the effect of pretreatment ("stripping" or devolatilization) of the carbon black (IRB #2) on its reactivity toward tetraallyltin in cyclohexane diluent. IRB #2 pellets were treated at 1000° C. for 30 minutes in a horizontal quartz tube under a purified helium stream flowing at about 100 milliliters/minute. Such a treatment removed adsorbed gases and water as well as most if not all of the surface oxygen moieties as oxides of carbon. The amounts of materials and results of these runs were as follows:

TABLE III

| Run number | 1 | 2 | 3 |
|---|---|---|---|
| Cyclohexane, milliliters | 200 | 200 | 200 |
| Industry Reference Black #2, grams | 0 | 3.1 | a3.1 |
| Tetraallyltin, millimoles | 0.8 | 0.8 | 0.8 |
| Percent original tin remaining at reaction time of— | | | |
| 0 hours | 100 | 100 | 100 |
| 0.75 hours | | 99 | 95 |
| 2.0 hours | | 92 | 96 |
| 4.5 hours | | 75 | 95 |
| 11 hours | 95 | 35 | 89 |
| 22 hours | 97 | 0 | 83 | a Carbon black pretreated as described above.

Each reaction mixture was agitated as before at 70° C. and samples of the liquid phase were analyzed for tin content by the X-ray fluorescence procedure.

The results in Table III demonstrate that pretreatment of the carbon black as described drastically reduced its ability to remove the tetraallyltin from the liquid phase.

EXAMPLE VI

Other runs were conducted in which the carbon black (IRB #2) was carefully dried under less extreme conditions than employed in Run No. 3 of Example V. Then, variable amounts of water were added. Further details of these runs and the results thereof appear in Table IV.

The carbon black employed in each run was dried under vacuum for 3 days at 150° C. and then handled and transferred in an inert dry nitrogen atmosphere. Cyclohexane was charged to each reaction vessel after the carbon black had been added. Water was added next to each vessel except the control (Run No. 1). Each reaction mixture was agitated briefly and then allowed to stand 1.5 hours before tetraallyltin was added. Samples of the liquid phase of the final reaction mixture were withdrawn and analyzed as before for tin content by the X-ray fluorescence procedure.

TABLE IV

| Run number | 1 | 2 | 3 | 4 |
|---|---|---|---|---|
| Cyclohexane, milliliters | 200 | 200 | 200 | 200 |
| Industry Reference Black #2, grams | 10 | 10 | 10 | 10 |
| Tetraallyltin, millimoles | 1.0 | 1.0 | 1.0 | 1.0 |
| Water, milliliters | 0 | 0.10 | 0.30 | 0.90 |
| Percent original tin remaining at reaction time of— | | | | |
| 0 hours | 100 | 100 | 100 | 100 |
| 0.5 hours | 90 | 84 | 82 | 83 |
| 1.0 hours | 89 | 76 | 76 | 74 |
| 2.0 hours | 85 | 61 | 58 | 47 |
| 3.0 hours | 83 | 44 | 41 | 25 |
| 5.0 hours | 82 | 15 | 9 | 3 |

These results indicate that a small amount of water, i.e., at least 0.5 percent by weight based on the black, greatly facilitates the removal of the organotin compound from the liquid phase by the predried carbon black. These results taken with those of Example V also show that the water normally present facilitates the interaction of such carbon blacks with the organometal compounds of our invention.

EXAMPLE VII

The following runs were conducted to prepare a treated carbon black and control for a rubber compounding evaluation study:

| Run number | 1 | 1 2 |
|---|---|---|
| Cyclohexane, milliliters | 500 | 500 |
| Industry Reference Black #2 | 50 | 50 |
| Tetrallyltin, millimole | 40 | 0 |

1 Control.

Each mixture was agitated for 40 hours at 70° C., poured into shallow pans, and the liquids evaporated in a fume hood. Each carbon black was then dried in a vacuum oven at 50° C. for 24 hours. The recovered weight of each carbon black was 57 grams in Run No. 1 and 49 grams in Run No. 2. The product from Run No. 1 contained 7.3 weight percent tin by X-ray fluorescence analysis. The above carbon blacks were evaluated in the following compound recipe with a second control carbon black, Run 3 (IRB #2, untreated):

Compounding Recipe

| | Parts, by weight |
|---|---|
| Polybutadiene rubber | 100 |
| Carbon black [1] | 50 |
| Zinc oxide | 3 |
| Stearic acid | 2 |
| Dutrex 726 [2] | 10 |
| Sulfur | 1.75 |
| Santocure NS [3] | 0.8 |

[1] Correction made in Run 1 for tin content of treated carbon black.
[2] Plasticizer and softener for rubber. Aromatic hydrocarbon from petroleum, specific gravity 0.991.
[3] N-tert-butyl-2-benzothiazolesulfenamide.

The stocks were mixed in an internal mixer (Plasti-Corder) at 120 revolutions per minute at 210° F. The cure characteristics of the three stocks were examined in a Monsanto Rheometer at 340° F. The results were as follows:

TABLE V

| Run number | 1 | 2 | 3 |
|---|---|---|---|
| Maximum viscosity, inch-pounds | 62.4 | 80.1 | 80.5 |
| Scorch (4 inch-pounds), minutes | 5.2 | 4.8 | 4.6 |
| Cure rate, inch-pounds/minutes | 1.53 | 18.9 | 20.2 |
| 95% cure, minutes | 50.1 | 10.6 | 10.7 |

The above results show a striking decrease in cure rate for the compound containing the treated carbon black of our invention (Run 1). An increase in scorch safety is also indicated for this compound, as indicated by both the cure rate and cure data.

EXAMPLE VIII

Two runs were conducted with smaller amounts of tin than Run 1 of Example VII for evaluation in rubber compounds, as shown below:

| Run number | 1 | 2 |
|---|---|---|
| Cyclohexane, milliliters | 500 | 500 |
| Industry Reference Black #2 | 100 | 100 |
| Tetraallyltin, millimoles | 7.8 | 14.9 |
| Reaction time, hours | 24 | 24 |
| Reaction temperature, ° C | 70 | 70 |
| Recovered [1] weight, grams | 100.5 | 101.6 |
| Tin content [2] weight percent | 0.76 | 1.4 |

[1] Recovered as described in Example VII.
[2] By X-ray fluorescence.

The above carbon blacks were evaluated in the same compounding recipe as employed in Example VII. Run 3 is a control run employing untreated IRB #2. The stocks were mixed as before and the cure characteristics examined at 293° F. in the Monsanto Rheometer. The results were as follows:

TABLE VI

| Run number | 1 | 2 | 3 |
|---|---|---|---|
| Maximum viscosity, inch-pounds | 82.0 | 79.0 | 83.2 |
| Scorch (4 inch-pounds), minutes | 18.4 | 19.4 | 16.7 |
| Cure rate, inch-pounds/minutes | 5.3 | 5.0 | 5.0 |
| 95% cure, minutes | 44.3 | 45.5 | 43.5 |

The results demonstrate that smaller amounts of tin on the treated blacks of our invention give a slight increase in time to 95 percent cure, with an accompanying increase in scorch safety.

Other variations and modifications of this invention will be apparent to those skilled in the art without departing from the spirit and scope of the invention.

We claim:

1. Carbon black containing at least 0.2 percent oxygen having an organometal compound combined therewith in an amount sufficient to increase the hydrophilic properties of the carbon black, said organometal compound having the formula $R_xR'_yM$ wherein R is a hydrogen or an aliphatic, cycloaliphatic, or aromatic radical containing from 1 to 20 carbon atoms, R' is a radical having the formula $$(-CR''_2-CR''=CR''_2) \text{ or } (-CR''_2-R''')$$

R'' is hydrogen or a hydrocarbyl radical containing from 1 to 6 carbon atoms,

R''' is an aromatic radical containing from 6 to 10 carbon atoms,

M is a metal selected from the group consisting of germanium, tin, lead, and antimony, x and y are integers whose sum is the valence of M, and y has a value of at least 1.

2. The carbon black of claim 1 wherein
M is tin, and
x and y are integers whose sum is 4, y having a value of at least 1.

3. The carbon black of claim 2 wherein
R is hydrogen or an alkyl group having 1 to 10 carbon atoms,
R' is a radical having the formula $-CH_2-CH_2=CH_2$ or $CH_2-R'''$; and
R''' is an aromatic radical containing from 6 to 10 carbon atoms.

4. The composition of claim 3 wherein the amount of organometal compound is 0.01 to 15 percent by weight based on the carbon black.

5. The composition of claim 3 wherein the amount of organometal compound is 0.1 to 7 percent by weight based on the carbon black, said carbon black being of the high abrasion furnace type.

6. The composition of claim 3 wherein the carbon black is of the high abrasion furnace type.

7. The composition of claim 3 wherein the organometal compound is tetraallyltin.

8. The composition of claim 3 wherein the organometal compound is butyltribenzyltin.

References Cited
UNITED STATES PATENTS

| | | | |
|---|---|---|---|
| 2,062,159 | 11/1936 | Brazzolara et al. | 106—307 |
| 2,350,846 | 6/1944 | Vogel et al. | 106—307 |
| 2,920,976 | 1/1960 | Damusis | 106—307 |
| 3,043,708 | 7/1962 | Watson et al. | 106—307 |
| 3,330,679 | 7/1967 | Jordan et al. | 106—307 |
| 3,431,205 | 3/1969 | Otto | 106—307 |

JAMES E. POER, Primary Examiner

UNITED STATES PATENT OFFICE

CERTIFICATE OF CORRECTION

Patent No. 3,692,553                                            Dated: September 19, 1972

Richard L. Smith and Carl A. Uraneck

It is certified that error appears in the above-identified patent and that said Letters Patent are hereby corrected as shown below:

Column 7, line 3, delete "a".

Signed and sealed this 6th day of February 1973.

(SEAL)
Attest:

EDWARD M. FLETCHER, JR.                              ROBERT GOTTSCHALK
Attesting Officer                                          Commissioner of Patents